Oct. 7, 1969     H. A. SEGAL     3,470,944
PLATTER COVER
Filed Sept. 3, 1968

INVENTOR
HERBERT A. SEGAL
BY
Seidel & Gonda
ATTORNEYS.

United States Patent Office 3,470,944
Patented Oct. 7, 1969

3,470,944
PLATTER COVER
Herbert A. Segal, Philadelphia, Pa., assignor to Samson Plastics, Inc., Cherry Hill, N.J., a corporation of New Jersey
Continuation-in-part of application Ser. No. 622,951, Mar. 14, 1967. This application Sept. 3, 1968, Ser. No. 756,777
Int. Cl. F28f 3/00; F28d 1/00; A47g 19/26
U.S. Cl. 165—47                                8 Claims

ABSTRACT OF THE DISCLOSURE

A platter cover having spaced walls defining a chamber for receiving heated liquids to maintain the temperature of food on a covered platter.

---

This application is a continuation-in-part of application Ser. No. 622,951 filed Mar. 14, 1967 and now Patent No. 3,429,369 granted Feb. 25, 1969.

This invention relates to a platter cover, and more particularly to an improved platter cover which has means for containing a heated liquid to maintain the temperature of covered food.

In various institutions, such as restaurants, hotels, hospitals, nursing homes, and the like, it is important to provide means whereby food can be served while it is hot. This is especially true wherein food is prepared in a central kitchen and may have to travel a substantial distance before being served. The disadvantages of prior art platter covers and serving carts, more fully set forth in my prior application referred to hereinabove, need not be set forth herein in detail. The prior art platter covers normally had a hole in the top to prevent condensation of moisture on the inside ceiling of the cover. If the hole were not provided, droplets of moisture would form and drip onto the food.

Suffice to say that prior art devices were not effective in maintaining food in the desired condition. The platter cover set forth in my previous application has performed well. However, I have found that I can eliminate various structure without resultant loss of function and several improvements have evolved as a result of further research.

It is a general object of the present invention to provide an improved platter cover.

It is another object of the present invention to provide an improved heat insulting platter cover.

It is still another object of the present invention to provide a platter cover having heat radiating properties.

It is yet another object of the present invention to provide a platter cover with means thereon for facilitating nesting of platter covers so that such covers will require less storage area.

It is yet a further object of the present invention to provide a platter cover which has means in a cap thereof to prevent creation of a vacuum so that the chamber within the cover can be rapidly opened and thereafter emptied.

Other objects will appear hereinafter.

The above and other objects are accomplished by means of the present invention. A platter cover is provided having an inner and outer wall which define a receiving chamber for hot liquids, such as water. The hot water acts as a radiant heater for food. Furthermore, the double wall thickness, together with the hot water, improves the heat insulation qualities of the platter cover. The inner and outer walls of the platter have different wall thicknesses so that the heat transfer will be in a downward direction towards the food. The thick outer wall provides insulation for the platter cover.

A tiny aperture is provided in the cap of the platter cover in order to avoid the creation of a vacuum so that the cap of the platter cover can be rapidly opened. The conventional hole in the top of the platter cover has been eliminated since there is no condensation of moisture on the heated inner wall.

I have found that substantial side flanges are unnecessary and that there is no significant avoidance of heat loss when side flanges are omitted. Furthermore, the omission of the flanges permits the platter cover to be used in combination with substantially any size plate. A flange is provided on the outer periphery of the platter cover to facilitate nesting of the covers.

A centrally located unitary cap is spin welded to the platter cover. A inner wall of the platter cover has a convex protrusion extending into the chamber directly beneath the cap so that hot liquid dispensed into the chamber will rapidly flow to the outer-most reaches of the chamber. Furthermore, since the lid of the cap may be fully opened with a minimum of effort, minimum cleaning of the platter cover of the instant invention is necessary. The outer wall is provided with a slight pitch to permit rapid dumping of hot water after the platter cover has been used.

For the purpose of illustrating the invention there is shown in the drawings a form which is presently preferred; it being understood, however, that this invention is not limited to the precise arrangements and instrumentalities shown.

Figure 1:
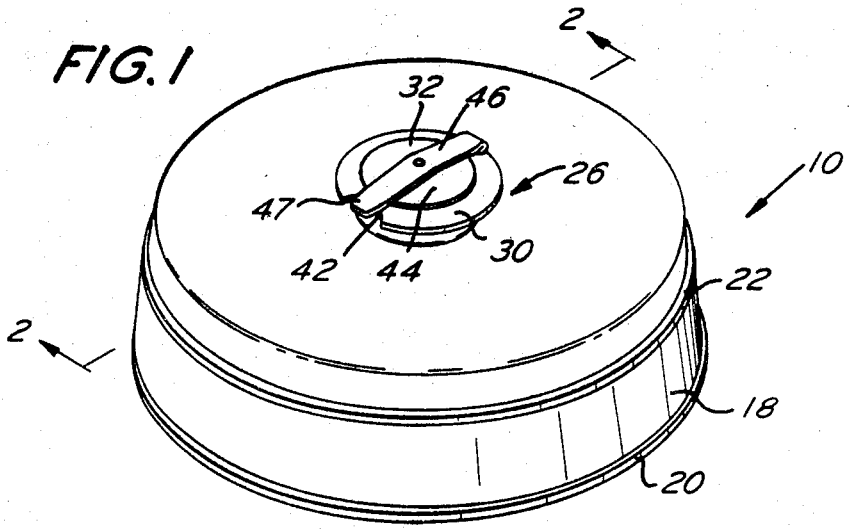
FIGURE 1 is a perspective view of a platter cover in accordance with the present invention.
Figure 2:
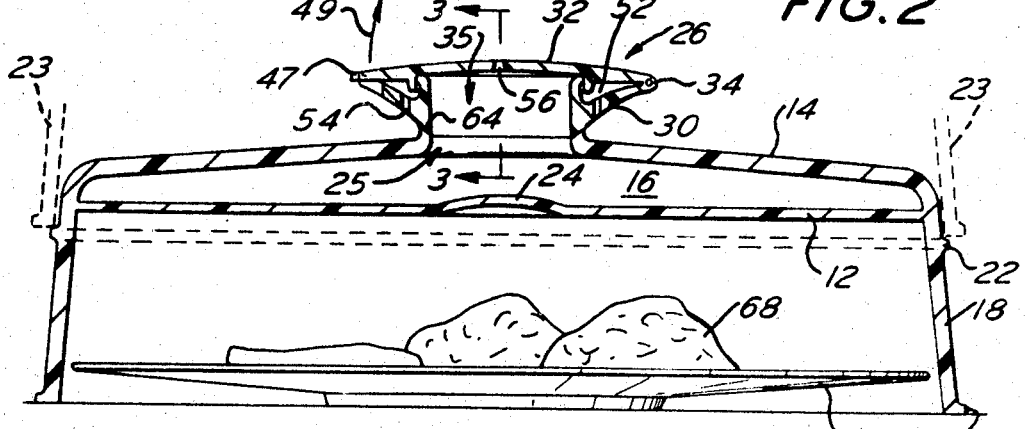
FIGURE 2 is a sectional view of the platter cover illustrated in FIGURE 1 taken along the lines 2—2.
Figure 3:
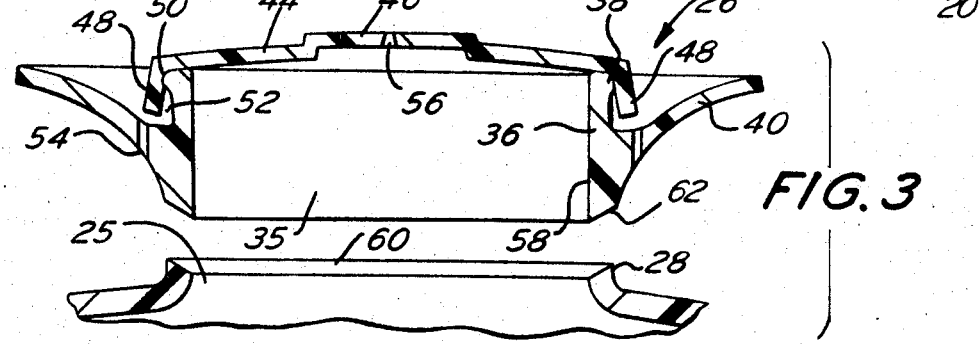
FIGURE 3 is a sectional view of the cap structure of the platter cover illustrated in FIGURE 2 taken along the lines 3—3 of FIGURE 2.

Referring now to the drawings in detail wherein like numerals indicate like elements throughout the several views, there is shown in FIGURES 1–3 a platter cover designated generally by the reference numeral 10.

Platter cover 10 includes an inner wall 12 and an outer wall 14. The inner wall 12 is a generally planar wall except as will appear hereinafter. The outer wall 14 is slightly convex but is generally parallel to the inner wall 12. The outer wall 14 has a slight pitch for a purpose to be made clear hereinafter. The inner wall 12 is substantially thinner than the outer wall 14 and hence has better heat conductivity. The platter cover 10 may be made of metal, such as stainless steel, or plastic. In either case, the material should be of the type that will withstand the high temperature of sterilization as well as the temperature of the liquid received therein. The outer wall 14 in the preferred embodiment is made of a relatively thick material and hence is less conductive of heat than inner wall 12. Plastics or metals which meet the requirements set forth are readily available in the open market. In the preferred embodiment the cover is made of polypropylene and wall 12 is approximately 25% thinner wall 14.

A chamber 16 is defined between the inner wall 12 and the outer wall 14. The platter cover 10 includes a generally frustoconical side wall 18 which forms a continuation of the outer wall 14. A peripheral flange 20 circumscribes the bottom of side wall 18 and lends additional support at the base of the platter cover. Another peripheral flange 22 circumscribes the upper end of the side wall 18. The flange 22 facilitates nesting of platter covers. The bottom portion of a nested platter cover 23 is shown in phantom line in FIGURE 2. Nesting in this manner permits the platter covers to be easily separated and yet require less storage space.

The inner wall 12 includes a convex protrusion 24 which may be semi-spherical if desired. The outer wall 14 has an opening 25 therein mounted immediately above the convex protrusion 24. A cap 26 is adapted to selectively close the opening 25. A hot liquid such as heated water is adapted to be introduced into the chamber 16 through an opening in the cap 26 and the opening 25. The heated liquid, which may be hot water, will be directed against the convex protrusion 24 and be caused to rapidly flow to the outermost reaches of the chamber 16. The pitch of the outer wall 14 facilitates rapid dumping of water from the chamber 16.

The outer wall 14 has an upstanding reduced neck portion 28 clearly illustrated in FIGURE 3. The integral cap 26 has a base 30 and a top 32. The base 30 and the top 32 are interconnected by an integral hinge 34 formed with the cap 26. The base 30 has an upstanding cylindrical member 36 which has an outer peripheral bulbous head 38. The base 30 also includes an outwardly projecting dish-shaped member 40. The dish-shaped member 40 provides a convenient handle for easy gripping and carrying of the platter cover. A C-shaped cutoff 42 is provided in the portion 40 for a purpose which will appear hereinafter. The base 30 has an opening 35 therein which is concentric with the opening 25 in the outer wall 14.

The top 32 of the cap 26 includes a circular lid 44 having a tab 46 integral therewith. The lid 44 and the tab 46 provide a closure for the opening 35. The circular lid 44 includes a downwardly depending peripheral lip 48 which has a peripheral groove 50 on the interior surface thereof. The groove 50 cooperates with the bulbous head 38 to provide a snap fit between the top 32 and base 30 of the cap 26. The tab 46 has a projecting end 47 which extends over the C-shaped cutout portion 42 of the dish-shaped member 40. It is merely necessary for a user to engage the projecting end 47 and lift the same upwardly in the direction of arrow 49 to uncover the opening 35 which communicates with the chamber 16.

The dish-shaped member 40 cooperates with the upstanding cylindrical member 36 to define a peripheral trough 52. Drain holes 54 are provided to eliminate any possible collection of stagnant liquid in the trough 52.

An airhole 56 is provided in the tab 46 to prevent the creation of a vacuum in the chamber 16 and hence permit the top 32 of the cap 26 to be easily separated from the base 30 when the chamber 16 is filled with a heated liquid.

The base 30 includes a downwardly depending lip 58 having a beveled end 62. The end 62 of lip 58 is adapted to mate with the beveled interior wall 60 on the upstanding neck 28 of the platter cover. The cap 26 is permanently affixed to the neck 28 by spin welding. Hence, when assembled the cap 26 is integral with and forms a part of the platter cover 10. The spin weld 64 is effected between the beveled end 62 and the beveled interior wall 60.

In general, it is intended that the platter cover be utilized in cooperation with a dish 66 having food 68 thereon which is to be kept warm. Accordingly, the thin inner wall 12 is adapted to radiate heat inwardly towards the food as illustrated in FIGURE 2. The diameter of the base of the frustoconical side wall 18 is sufficient to permit the platter cover to be placed over the dish 66. In most institutions, a standard sized dish is used. The diameter of the base of the platter cover may be large enough to cover an entire plate as shown in FIGURE 2, or it could rest on the outer peripheral portion of the plate. In most instances, it may be desirable to provide smaller platter covers because of space limitations on a carrying tray. However, a large platter cover will perform its desired function when covering dishes substantially smaller than dish 66 illustrated in the drawing.

Heat radiating from the hot liquid such as hot water in the chamber 16 will serve to maintain the temperature of the food 68 on a dish 66. In addition, the hot liquid will act as an insulator to prevent the escape of heat through the walls 12 and 14. Very little heat will escape through the side wall 18, since as mentioned above, the wall 18 is made of the same thick material as wall 14.

The present invention may be embodied in other specific forms without departing from the spirit or essential attributes thereof and, accordingly, reference should be made to the appended claims, rather than to the foregoing specification as indicating the scope of the invention.

I claim:

1. A platter cover comprising an inner wall spaced from an outer wall and defining a chamber therebetween, a frustoconical side wall extending downwardly from said outer wall, an opening in said outer wall, cap means secured to said outer wall, an opening in said cap means aligned with the opening in said outer wall, said cap means including a lid for selectively covering and uncovering said cap opening, means on said side wall to facilitate stacking of a plurality of platter covers, said inner wall having a convex protrusion extending into said chamber to effect rapid dispersal of hot liquid admitted into said chamber through the opening in said cap means.

2. A platter cover as set forth in claim 1 wherein said cap means includes a base portion and a top portion, said outer wall having an upstanding neck defining the opening in said outer wall, the base portion of said cap means being spin welded to said neck.

3. A platter cover as set forth in claim 1 wherein said cap means includes a base portion and a top portion, said base portion having an upstanding cylindrical member with a projecting bulbous head, said cylindrical member defining said cap opening, said lid having a downwardly depending leg, said downwardly depending leg having a peripheral groove therein, said top portion being adapted to be removably connected to said base portion by interengagement of said peripheral groove and said bulbous portion, said lid having a tab integral therewith so that said top portion can be readily lifted from said base portion, and a hinge interconnecting said base and top portions and being integral therewith.

4. A platter cover as set forth in claim 1 wherein said lid member has a hole therein to prevent creation of a vacuum within said chamber.

5. A platter cover as set forth in claim 4 wherein said cap means includes a peripheral trough, drain holes in said trough to prevent collection of stagnant water.

6. A platter cover as set forth in claim 2 wherein said base portion includes an outwardly projgecting dish-shaped member having a C-shaped cutout, a tab integral with said top portion overlying said C-shaped cutout, said dish-shaped member providing a convenient handle for facilitating gripping and carrying said platter cover.

7. A platter cover as set forth in claim 1 wherein said convex protrusion is circular in shape.

8. A platter cover as set forth in claim 1 wherein said outer wall is convex to ficilitate rapid dumping of cooled liquid from said chamber.

References Cited

UNITED STATES PATENTS

| 24,636 | 7/1859 | Smith | 165—73 |
|---|---|---|---|
| 3,326,021 | 6/1967 | Latulippe | 67—87 |
| 2,833,906 | 5/1958 | Wingo | 126—261 |

ROBERT A. O'LEARY, Primary Examiner

C. SUKALO, Assistant Examiner

U.S. Cl. X.R.

67—87; 126—261; 165—73